United States Patent [19]
Ziegler

[11] 4,165,212
[45] Aug. 21, 1979

[54] MULTIPLE EXTRUSION HEAD ASSEMBLY

[75] Inventor: William E. Ziegler, Ann Arbor, Mich.

[73] Assignee: Hoover Universal, Inc., Saline, Mich.

[21] Appl. No.: 882,646

[22] Filed: Mar. 2, 1978

[51] Int. Cl.² ............................................. B29D 23/04
[52] U.S. Cl. ................................ 425/382 R; 425/532; 425/464; 425/466
[58] Field of Search ................ 264/209; 425/532, 466, 425/467, 464, 380, 381, 382 R, 145, DIG. 5

[56] References Cited

U.S. PATENT DOCUMENTS

| | | | |
|---|---|---|---|
| 3,909,183 | 9/1975 | Hsu | 425/466 |
| 3,918,874 | 11/1975 | Dybala et al. | 425/382 R |

*Primary Examiner*—Mark Rosenbaum
*Attorney, Agent, or Firm*—Olsen and Stephenson

[57] ABSTRACT

Apparatus for extruding a plurality of tubes of plastics material simultaneously for blow molding purposes comprising a plurality of extrusion heads, each having an accumulator chamber from which plastics material can be discharged intermittently to form the tubes, and a mechanism operatively connected to discharge means associated with each accumulator chamber for synchronizing the filling and discharging of the accumulator chambers so that a single source of plastics material can be used to fill the accumulator chambers at a substantially uniform rate and the mold halves of a single blow mold can be opened and closed on the extruded tubes which are discharge simultaneously and will be of uniform length.

8 Claims, 2 Drawing Figures

MULTIPLE EXTRUSION HEAD ASSEMBLY

BACKGROUND OF THE INVENTION

The present invention relates to an extrusion head assembly for extruding simultaneously a plurality of tubes of plastics material between the open halves of a mold for subsequent blow molding purposes.

It is a common procedure to use multiple extrusion heads with a screw extruder to form hollow tubes that can be blown in molds to the shapes of hollow articles. When this procedure is practiced using dual extrusion heads with accumulator chambers allowing intermittent extrusion, of the types shown, for example, in U.S. Pat. No. 3,909,183, or U.S. Pat. No. 3,611,494, it is common practice to use separate mold clamps and associated mold halves for operation below each extrusion head. The cycles of operation at the extrusion heads are then diametrically opposed, that is, extrusion will be occurring at one extrusion head while the mold halves associated therewith are open, and blowing will then be occurring at the other extrusion head at which the associated molds will be closed, and the accumulator chamber at this head will be receiving plastics material in the charging portion of the cycle. The principal reason for alternating the cycles of operation of the dual extrusion heads is to avoid numerous problems that otherwise are inherent in this type of operation when using prior art apparatus and procedures.

These problems relate to uneven supply of plastics material from the one screw extruder to the dual or multiple extrusion heads and their associated accumulator chambers, uneven discharge from the extrusion heads so that one extruded tube may be longer than another, irregular timing of discharge so that the tubes to be blown may have stretched to different lengths, and the like. These irregular operating conditions produce further undesirable results, such as that they slow the cycles of operation, cause greater waste of plastics material, cause a higher percentage of "rejects" to be blown, and similar results.

Thus, to overcome these problems, the blow molding industry alternates the cycles of operation of the dual extrusion heads, and when so doing, separate clamps and associated molds, as well as separate controls and similar features for each head are required, increasing equipment and operating costs.

SUMMARY OF THE INVENTION

The present invention provides apparatus which has overcome the inadequacies of the prior art and allows dual or multiple extrusion heads of the accumulator type to be used with one screw extruder and with one clamp and mold assembly, wherein the articles are blow molded simultaneously from tubes of plastics material that are also extruded simultaneously from the dual or multiple extrusion heads.

According to one form of the present invention, an extrusion head assembly is provided which has dual extrusion heads for intermittently extruding tubes of plastics material for blow molding operations. The dual extrusion heads can be of conventional types, and a mechanism is provided which is connected to the discharge means of each of the extrusion heads for synchronizing the operation of the discharge means so that the tubes of plastic are discharged simultaneously from the head, and also so that the accumulator chambers of the extrusion heads are charged simultaneously with new plastics material. In a preferred form of the invention, the mechanism includes a torsion shaft mounted for rotation around its longitudinal axis, and connecting means couple each of the discharge means of the respective extrusion heads to the torsion shaft for maintaining uniform action of the discharge means relative to the rotary action of the torsion shaft. In this form of the invention, various arrangements may be utilized for coupling the torsion shafts to each of the discharge means of the respective extrusion heads. One preferred form includes using a lever arm at each extrusion head, the lever arm having one of its ends connected to the torsion shaft for rotation therewith and the other of its ends has a cam follower adapted to travel on a cam surface of the discharge means associated with each extrusion head. This arrangement will require the discharge means of each extrusion head to reciprocate together with the corresponding discharge means of the other extrusion head. It is contemplated that other connecting means, such as a rack and pinion, may also be used to interconnect the discharge means of each extrusion head with the torsion shaft. The present invention overcomes problems inherent when using dual extrusion heads, including the problems encountered relative to obtaining uniform charging of each of the accumulator chambers in the extrusion heads, and also relative to discharging the material from the accumulator heads. Thus, by the present invention, tubes of identical configurations and physical properties are introduced between the open mold halves for subsequent blow molding operations therein after the mold halves have been closed by a single clamping mechanism.

Other objects of this invention will appear in the following description and appended claims, reference being had to the accompanying drawings forming a part of this specification wherein like reference characters designate corresponding parts in the several views.

DESCRIPTION OF THE PREFERRED EMBODIMENTS

Figure 1:
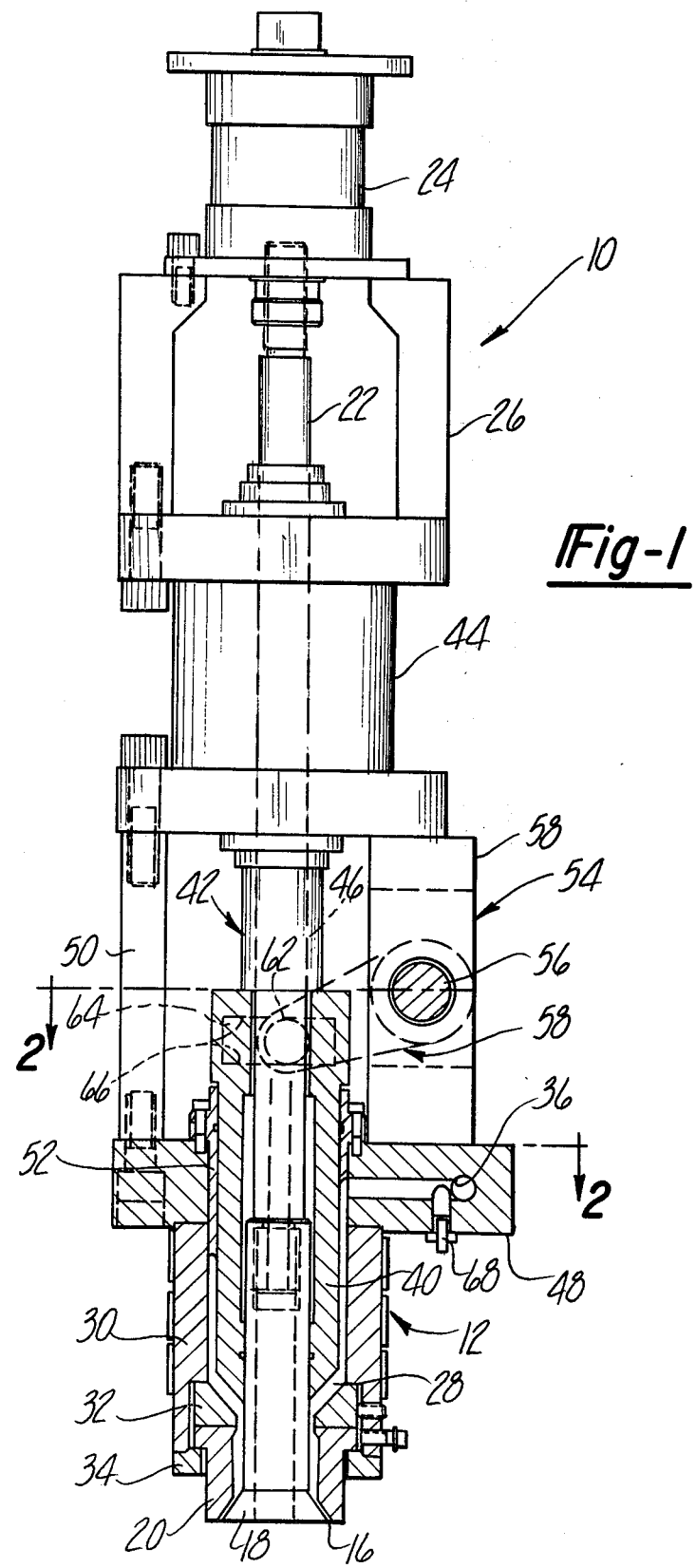
FIG. 1 is a side elevational view, partly in section, showing a dual extrusion head assembly embodying the present invention.
Figure 2:
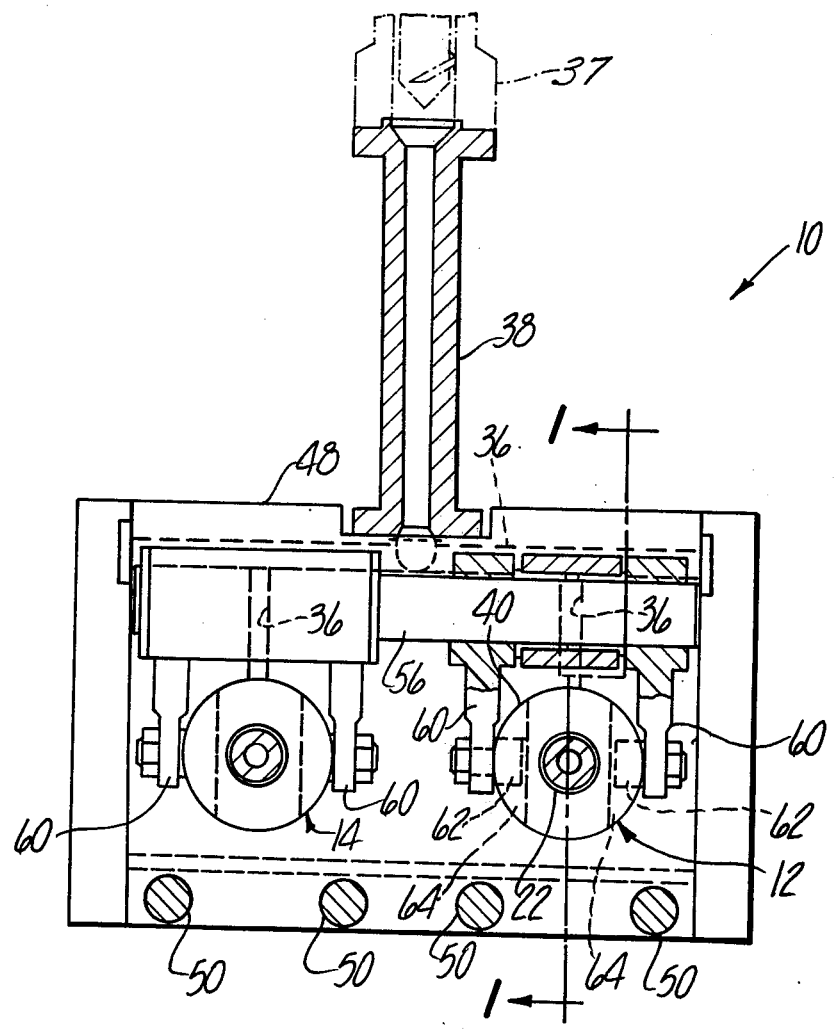
FIG. 2 is a section taken on the lines 2—2 of FIG. 1, and showing fragmentarily in broken lines a screw extruder.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. The extrusion head assembly 10 includes the dual extrusion heads 12 and 14, only the former of which will be described in detail, because the extrusion heads are constructed and arranged essentially the same.

Extrusion head 12 has an annular outlet orifice 16 which is defined by the lower end of the mandrel 18 and the outlet die ring 20. The mandrel 18 is attached to a mandrel extension 22, which is suitably secured to the rod of the programmer cylinder 24. The latter is mounted on the support 26 which is operated in the conventional manner for moving the mandrel extension 22 axially, and thereby the mandrel 18, to vary the wall thickness of a tube that is extruded through the annular outlet orifice 16. An accumulator chamber 28 is provided upstream of the annular outlet orifice 16 and is defined within the confines of the housing 30, backpressure ring 32 and the outer wall of the mandrel 18. The members 20, 30 and 32 are clamped together as a unit by the clamp ring 34.

The accumulator chamber 28 is in communication at its lower end with the annular outlet orifice 16 and at its upper end with the inlet passageway 36 through which plastics material can be received from a screw extruder (not shown) via the nozzle 38. When plastics material is introduced into the accumulator chamber 28 via the passageway 36, the annular plunger 40 which is part of the discharge means 42 will be moved in an upward direction until the accumulator chamber 28 has been fully charged with plastics material. Thereafter, by suitable control apparatus (not shown) the fluid cylinder 44 will be actuated and its rod 46 will act upon the plunger 40, causing it to descend, and thereby to discharge a tube of plastics material out of the annular orifice 16 where it can be clamped between mold halves of a blow mold (not shown). The fluid cylinder 44 is supported on the die block 48, which contains passageway 36, in part by the plurality of cylinder stilts 50. In this arrangement, the plunger 40 is supported for axial movement within the plunger sleeve 52 which is mounted in a stationary position on the die block 48. The construction and arrangement of the die head 12 that is set forth above is conventional in the art and further explanation is not deemed necessary.

The mechanism 54 which is connected to both of the discharge means 42 for synchronizing their operations so that the respective accumulator chambers 28 are charged simultaneously from the screw extruder (not shown) and discharged simultaneously as tubes of plastics material which can be clamped simultaneously by a single blow mold (not shown) will now be described. The mechanism 54 includes a torsion shaft 56 which is mounted on support members 58 for rotation about the longitudinal axis of shaft 56, and connecting means 58 are provided which couple the torsion shaft 56 to each of the discharge means 42 of the respective extrusion heads 12 and 14 for maintaining uniform action of the discharge means relative to the shaft 56. In the preferred embodiment, the connecting means 58 includes the lever arms 60 which are keyed at their inner ends to the torsion shaft 56 for rotation therewith, and which have at their outer ends cam followers 62 which are located in the slots 64 in the plungers 40. Thus, when each plunger 40 moves vertically, the associated cam follower 62 can move freely in a lateral direction on the cam surfaces 66, defined by the slots 64, and the vertical movement of the plungers 40 will then be transmitted to the torsion shaft 56 as rotary movement about its axis.

From the foregoing description, it will be understood that when plastics material is charged into the two accumulator chambers 28, the plungers 40 which are part of the discharge means 42 will be moved upward. If the tendency is for the plastics material to flow more freely to the one accumulator chamber 28 than the other, then the plunger 40 associated with that accumulator chamber will assume the load of raising the other plunger 40, and increased back pressure to flow to the one accumulator chamber 40 than to the other accumulator chamber 40 will be encountered tending to equalize the flow of plastics material to the two accumulator chambers 40. Only one set of controls (not shown) are required to reverse movement of the plungers 40 so as to discharge the plastics material through the outlet orifice 16, and this operation will also be synchronized by the mechanism 54 so that each of the tubes that are discharged will have essentially the same dimensions and physical properties when clamped within the single blow mold for the blowing operation. As seen in FIG. 1, a conventional choke screw 68 may be located in passageway 36 to aid in balancing the flow of plastics material to the two accumulator chambers 28.

It is claimed:

1. An extrusion head assembly comprising a plurality of extrusion heads for extruding tubes of plastics material, each extrusion head having an annular outlet orifice, an inlet passageway for receiving plastics material from a screw extruder, an accumulator chamber in communication with said outlet orifice and said inlet passageway for accumulating plastics material from said screw extruder, and discharge means for intermittently discharging the accumulated plastics material through said outlet orifice to form said tubes, and a mechanism connected to each of said discharge means synchronizing the operation of said discharge means so that the tubes of plastics material are discharged from each head synchronously, said mechanism interconnecting the plungers so that if the plastics material tends to flow to one accumulator chamber with greater ease than to a second accumulator chamber the plastics material acting on the one plunger will then tend to move the second plunger also thereby increasing the back pressure of the plastics material to said one accumulator chamber to balance the flow to the accumulator chambers.

2. The extrusion head assembly that is defined in claim 1 wherein said mechanism includes a torsion shaft mounted for rotation around its longitudinal axis, and connecting means coupling each of said discharge means to said torsion shaft for maintaining uniform action of said discharge means relative to the rotary action of said torsion shaft.

3. The extrusion head assembly that is defined in claim 2, wherein said discharge means includes a fluid cylinder assembly operable for intermittently discharging the accumulated plastics material from the accumulator chamber, and said connecting means mechanically couple said torsion shaft to each of said discharge means so that the fluid cylinder assemblies are restrained to discharge in unison.

4. The extrusion head assembly that is defined in claim 2, wherein a single nozzle is provided for receiving plastics material from a screw extruder and directing the plastics material into said inlet passageway for flow to the accumulator chambers, said fluid cylinder assemblies being actuated by the input of plastics material into the accumulator cylinders to move to positions for discharging the accumulated plastics material therefrom, said torsion shaft restraining the filling of any one accumulator chamber more rapidly than any other accumulator chamber.

5. An extrusion head assembly comprising a plurality of extrusion heads for extruding simultaneously tubes of plastics material, each extrusion head having an annular outlet orifice, an accumulator chamber in communication with said outlet orifice and having an inlet port arranged for receiving plastics material from a screw extruder, a plunger associated with the accumulator chamber and movable in one direction for discharging a tube of plastics material through said orifice and movable in the other direction when recharging said chamber with plastics material from said extruder, and an actuator means connected to said plunger for moving said plunger in said one direction, a nozzle for receiving plastics material from the screw extruder, and passage means extend from said nozzle to each said inlet port so that said accumulator chambers can receive plastics material simultaneously from said screw extruder, each accumulator chamber and its plunger being arranged so that the plastics material received from said screw extruder will act on the plunger moving it in said other direction, and a mechanism operatively connected to each plunger restricting the movements of the plungers to synchronous action so that the tubes of plastics material are discharged simultaneously from each head, said mechanism interconnecting the plungers so that if the plastics material tends to flow to one accumulator chamber with greater ease than to a second accumulator chamber the plastics material acting on the one plunger will then tend to move the second plunger also thereby increasing the back pressure of the plastics material to said one accumulator chamber to balance the flow to the accumulator chambers.

6. The extrusion head assembly that is defined in claim 5, wherein said mechanism includes a torsion shaft extending adjacent to each of said plungers and mounted for rotation about its axis, and connecting means coupling each of said plungers to said torsion shaft for maintaining uniform reciprocating movements of said plungers relative to rotary action of said torsion shaft.

7. The extrusion head assembly that is defined in claim 6, wherein said connecting means associated with each plunger includes a lever arm secured at its one end to said torsion shaft for rotation therewith, a cam follower mounted on said lever arm adjacent to its other end, and a cam operatively connected with said plunger for receiving said cam follower.

8. The extrusion head assembly that is defined in claim 7, wherein said plunger has a transverse slot that provides the surface of said cam, and said cam follower is a roller mounted on said lever arm.

* * * * *